United States Patent [19]

O'Donnell, Jr. et al.

[11] Patent Number: 5,803,081
[45] Date of Patent: Sep. 8, 1998

[54] TOBACCO AND RELATED PRODUCTS

[75] Inventors: Francis E. O'Donnell, Jr., St. Louis, Mo.; Jonnie R. Williams, Goochland, Va.

[73] Assignee: Regent Court Technologies, Chesterfield, Mo.

[21] Appl. No.: 757,104

[22] Filed: Dec. 2, 1996

Related U.S. Application Data

[63] Continuation-in-part of Ser. No. 671,718, Jun. 28, 1996, and a continuation-in-part of Ser. No. 725,691, Sep. 23, 1996, and a continuation of Ser. No. 739,942, Oct. 30, 1996.

[60] Provisional application No. 60/003,186, Sep. 5, 1995, and provisional application No. 60/009,932, Jan. 16, 1996, and provisional application No. 60/015,933, Apr. 22, 1996, and provisional application No. 60/023,205, Aug. 5, 1996.

[51] Int. Cl.⁶ .................................................. A24B 15/00
[52] U.S. Cl. .......................................... 131/299; 131/290
[58] Field of Search .................................. 131/290, 299, 131/292, 294, 295; 432/500; 426/384, 520, 521

[56] References Cited

U.S. PATENT DOCUMENTS

| | | | |
|---|---|---|---|
| 2,758,603 | 8/1956 | Heljo | 131/299 |
| 3,394,709 | 7/1968 | Remer | 131/299 |
| 3,494,723 | 2/1970 | Gray | 131/299 X |
| 3,494,724 | 2/1970 | Gray | 131/299 X |
| 3,699,976 | 10/1972 | Abe et al. | 131/299 |
| 3,773,055 | 11/1973 | Stungis et al. . | |
| 3,845,774 | 11/1974 | Tso et al. . | |
| 3,870,053 | 3/1975 | Heitkamp et al. | 131/299 |
| 3,877,468 | 4/1975 | Lichtneckert et al. . | |
| 3,902,408 | 9/1975 | Lichtneckert . | |
| 4,317,837 | 3/1982 | Kehoe et al. . | |
| 4,430,806 | 2/1984 | Hopkins . | |
| 4,559,956 | 12/1985 | De Lange et al. | 131/299 X |
| 4,802,498 | 2/1989 | Ogren . | |
| 4,821,747 | 4/1989 | Stuhl et al. . | |
| 4,874,000 | 10/1989 | Tanol et al. . | |
| 4,898,189 | 2/1990 | Wochnowski | 131/299 |
| 5,488,962 | 2/1996 | Perfetti . | |

FOREIGN PATENT DOCUMENTS

| | | | |
|---|---|---|---|
| 1767677 | 6/1968 | Germany | 131/299 |

OTHER PUBLICATIONS

Declaration of Harold R. Burton, Ph.D with Exhibits A–H as follows.
(A) Data from QD, FD,MW Sample Testing/1993 Study.
(B) Data from QD and FD Sample Testing/1994 Study.
(C) Progress Report/Undated.
(D) CORESTA Conference, Agronomy & Phytopathology Joint Meeting, Reunion Commune Des Groupes Agronomie Et Phytopathologie/Abstracts, Oxford 1995 (see Abstract on p. 5—Burton et al.).
(E) Overheads from 1995 CORESTA conference presentation by Burton, 1993 Study.
(F) Overheads from 1995 CORESTA conference presentation by Burton, 1994 Study.
(G) Wiernik et al., Effect of Air–Curing on the Chemical Composition of Tobacco/1995.
(H) Burton Letter to Jonnie R. Williams.
Recent Advances in Tobacco Science—vol. 21—49th Meeting—Tobacco Chemists Research Conference—Sep. 24–27, 1995, Lexington, Kentucky—pp. 38–80—Impact of Plant Manipulation & Post Harvest Phenomena on Leaf Composition.

*Primary Examiner*—V. Millin
*Assistant Examiner*—William J. Deane, Jr.
*Attorney, Agent, or Firm*—Sughrue, Mion, Zinn, Macpeak & Seas, PLLC

[57] ABSTRACT

Tobacco products improved by the use of uncured, yellow tobacco low in tar and carcinogenic nitrosamines, treated by microwaving, or convection heating, or freeze drying to kill microbes responsible for curing, for use in smoking tobacco, chewing tobacco, tobacco chewing gum, beverages and foods. In one preferred embodiment tobacco, uncured or cured, is microwaved to reduce further tar and carcinogenic nitrosamines.

13 Claims, 3 Drawing Sheets

TOBACCO AND RELATED PRODUCTS

CROSS-REFERENCE TO RELATED APPLICATIONS

This is a regular, nonprovisional patent application claiming priority to previous provisional applications, those being: Ser. No. 60/003,186, filed Sep. 5, 1995; Ser. No. 60/009,932, filed Jan. 16, 1996; Ser. No. 60/015,933, filed Apr. 22, 1996; Ser. No. 60/023,205, filed Aug. 5, 1996; and a continuation-in-part of application Ser. No. 08/671,718, filed Jun. 28, 1996, and a continuation in part of application Ser. No. 08/725,691, filed Sep. 23, 1996, and a continuation of application Ser. No. 08/739,942 filed Oct. 30, 1996.

BACKGROUND OF THE INVENTION

This invention relates generally to an improved tobacco product, and more specifically to tobacco product enhanced by a novel curing process.

Chewing gums that have been altered to include nicotine and other flavoring components have been available in the art. Ordinary chewing gum has been used as a substitute for smoking tobacco with marginal success. In a smoke-free environment, the oral gratification provided by chewing gum can only somewhat ease the smoker's craving for tobacco smoke. In U.S. Pat. No. 3,901,248, a cation exchange resin, nicotine-containing chewing gum is described. Unfortunately, the gum has poor taste. U.S. Pat. No. 3,877,468 discloses the addition of nicotine without a time-release cation-exchange resin. However, the gum had poor chewing characteristics because of a 40% by weight minimum gum base content. Alternatively, in U.S. Pat. No. 5,488,976, a chewing gum with not more than 25% by weight gum base is described with up to 0.4 mg of nicotine added. It is described as having good chewing characteristics and flavor with sustained release of nicotine into the saliva. These prior art chewing gums have all used variable amounts of nicotine to help the smoker reduce his craving for nicotine and smoking. Further, by providing a step-down program of graded reduction in nicotine content, these prior art inventions have offered a way for the smoker to break the smoking habit.

Others have described various inventions wherein tobacco rather than nicotine has been added to chewing gum. In U.S. Pat. No. 4,317,837, issued to Kehoe, for example, tobacco is added to a chewable gum base having at least 10% air voids entrapped. Later, Ogren, in U.S. Pat. No. 4,802,498, taught the addition of propolis resin to a chewing gum-tobacco leaf mixture. This enhanced the flavor of the tobacco chewing gum mixture. It reduced the bitterness of the tobacco in the gum. Essentially, tobacco was added as a flavoring ingredient to gum and the propolis was a minor ingredient. In that style of tobacco-chewing gum, the propolis was proposed as a breath freshener, with mild anesthetic properties to decrease the irritation caused by chewing tobacco. Hence in this prior art device, to achieve these attributes, the propolis was merely an adjuvant and not a major ingredient, as is the tobacco. As such, the potential for harmful tobacco side effects such as oral cancers from prolonged tobacco-chewing gum usage limited the acceptance of such products.

Prior art has described the use of microwave energy to dry agricultural products including green tobacco (U.S. Pat. No. 4,430,806). Wochnowski, for example in U.S. Pat. No. 4,898,189 teaches the use of microwave to treat green tobacco in order to control moisture content in preparation for storage or shipping. In U.S. Pat. No. 3,699,976, microwave energy is used to kill insect infestation of tobacco. Moreover, techniques using impregnation of tobacco with inert organic liquids (U.S. Pat. No. 4,821,747) for the purposes of extracting expanded organic materials by a sluicing means have been disclosed wherein the mixture was exposed to microwave energy. In yet another invention, microwave energy is disclosed as the drying mechanism of extruded tobacco-containing material (U.S. Pat. No. 4,874,000). Stungis (U.S. Pat. No. 3,773,055) taught the use of microwave to dry and expand cigarettes made with wet tobacco.

Prior art attempts to reduce tar and harmful carcinogenic nitrosamines primarily have consisted of the use of filters in smoking tobacco. In addition, attempts have been made to use additives to block the effects of harmful carcinogens in tobacco. These prior art technologies have failed to reduce the oncologic morbidity associated with tobacco use. From prior art (Burton), we know that fresh-cut "green" tobacco has virtually no nitrosamine carcinogens. Moreover, prior art has taught that during smoking, very little, if any, nitrosamines are produced. Therefore, the curing process itself must be responsible for production of the harmful carcinogenic nitrosamines such as N-nitrosonornicotine (NNN) and 4-(methyl-nitrosamino)-1-(3-pyridyl)-1-butanone (NNK). It is unclear whether microbial nitrate reductases or intrinsic cytosol nitrate reductase is primarily responsible for the reduction of nitrate to nitrite. Subsequently, the nitrite so produced is converted to ammonia and other nitrosating species, which under acidic conditions, product the tobacco specific nitrosamines. Unfortunately, fresh-cut green tobacco is unsuitable for smoking or other consumption. In the present invention, we have determined a way to modify the curing process so as to produce a very low level of carcinogenic nitrosamines and reduced tar while preserving flavor and nicotine. This results in an improved tobacco product with virtually no carcinogenic potential.

Burton, H. R., Editor, Recent Advances in Tobacco Science, Vol. 21, Symposium Proceedings, Sept. 24–27, 1995, Lexington, Ky.

SUMMARY OF THE INVENTION

The present invention includes a chewing gum, and more specifically, in one embodiment, a gum base to which is added a finely ground or particulate, powdery ingredient comprising the pulverized or powdered tobacco that is produced when tobacco is chopped. The principle of this invention is to provide a gum base which, during its intermixing into a chewing gum base, may have added to it a finely ground powder of pure tobacco in order to provide the tobacco flavor to the gum.

Another object of the invention is to provide a chewing gum that is flavored with a tobacco powder or dust which provides enhanced tobacco flavor when chewed but minimizes the user's exposure to peaks of nicotine since the tobacco maintains its physical attributes because it is added as a powder or dust.

Yet another object of the invention is to use propolis by directly applying it to tobacco in order to favorably alter its flavor.

Another object of the invention is to add propolis to the tobacco to reduce the particulate and tar content of the tobacco for smoking.

A further object of the invention is to enhance tobacco, particularly "uncured", so-called "green" tobacco, to produce a tobacco product by novel curing means that has reduced carcinogenic nitrosamine content.

Still another object of the invention is to spray whole tobacco leaf, either green or cured, with propolis or dip whole tobacco leaf, either green or cured in propolis. In order to make smoking tobacco or chewing tobacco have a more mellow and less bitter flavor, with minimum after taste.

Another object of the present invention provide a propolis-treated tobacco chop to be added to a chewing gum or other product in an adjustable ratio that modulates the nicotine content and the content of monoamine oxidase B inhibitor.

Yet another object of the invention is to provide a chewing gum or other product in which the propolis-tobacco chop acts as a reservoir for sustained release of nicotine and monoamine oxidase B inhibitor and for prolongation of flavor.

Another object is to provide a tobacco-containing chewing gum wherein propolis-treated tobacco chop of variable nicotine content is added to a small quantity of chewing gum (1.2 to 3.5 g) so that the total nicotine content is less than 1.0 mg per piece of gum and wherein the natural tobacco may contain monoamine oxidase B inhibitor such as found in tobacco smoke.

Still another object of the invention is to provide a method of controlling weight gain in a non-smoker by providing controlled delivery of nicotine and monoamine oxidase B inhibitor in a tobacco product.

Another object of the present includes the use of uncured tobacco in order to reduce the content of harmful carcinogenic nitrosamines such as N-nitrosonornicotine (NNN) and 4-(methyl-nitrosamino)-1-(3-pyridyl)-1-butanone (NNK) and tar.

Another object of the present invention is to treat uncured "yellow" tobacco with microwave energy so as to arrest the curing process without adversely affecting the suitability for human consumption.

Yet another object of the invention is to treat cured or uncured tobacco with microwave energy so as to decompose the nitrosamines and thereby significantly reduce the level of carcinogens and tar.

Still another object of the invention is to reduce tobacco waste by using uncured tobacco stripped of a portion of its stem and thereby eliminate the need for processing with a thrasher machine.

Another object of the present invention treats fully cured tobacco to reduce the nitrosamine and the tar content.

The principal of this invention is to provide a gum base, which during intermixing into a chewing gum base may have added to it a very finely ground powder of pure tobacco in order to provide the tobacco flavor to the gum when chewed. In addition it also may include other flavoring ingredients to provide a hint of other flavors added to the tobacco taste. The gum is manufactured by adding a precise amount of processed or green natural tobacco leaf to the raw gum batch. During the manufacture of cigarettes, for example, the tobacco is chopped and a dust-like by-product is created. This tobacco has a flour-like texture which can be added directly to the gum base.

Also generally described is the novel use of propolis to enhance tobacco. In one instance, propolis is mixed in a solution, whether it be a water base or oil base solution, and applied to the whole tobacco leaf or chopped tobacco. It can be applied by spray or by dipping in order to provide for a degree of coating or even saturation. The propolis works to enhance favorable aspects of tobacco when smoked or when chewed. When used on tobacco chop, before it is added to gum, it enhances the richness and duration of the flavor of the tobacco-chewing gum mixture.

Propolis-tobacco chop, tobacco extract or tobacco chop can be added to coffee or tea before brewing for creation of a tobacco flavored beverage. Alternatively, the propolis-tobacco chop, tobacco extract or tobacco chop alone can be added to a cup of the brewed beverage so as to allow individual adjustment to the consumer's taste. Propolis also can be added to other food products to reduce bitterness and unpleasant aftertaste and to prolong the favorable and flavorful experience during consumption.

Another embodiment of the present invention is a tobacco containing gum that is designed to reduce the craving for tobacco smoke or tobacco chew by providing a sustained release of nicotine and monoamine oxidase B inhibitor from propolis-treated tobacco chop mixed into a chewing gum with less than 30% by weight gum base. As opposed to the addition of propolis to the gum base (Ogren, U.S. Pat. No. 4,802,498), the present invention pre-treats the tobacco chop. This causes sustained release of the tobacco content over a 45 minute interval avoiding unpleasant peaks of nicotine, while prolonging the flavor of the gum. When incorporated into a small chicalet-like quantity of gum, the total nicotine content is below 0.2 mg per stick (FDA guidelines), but the end user can comfortably chew two or more pieces at one time to accommodate his craving for a tobacco product.

Another embodiment of the invention includes aging the tobacco for one to fifteen days and allows for the conversion of chlorophyll into sugars. A corresponding color change from green to yellow occurs. This causes perhaps a slight increase in carcinogenic nitrosamines but still significantly less that typically cured tobaccos. This "yellow" tobacco is then efficiently stripped of a portion of its stem and then microwaved briefly at very high energy levels to arrest the curing process and to reduce the carcinogenic nitrosamines.

DESCRIPTION OF THE PREFERRED EMBODIMENT

Figure 1A:
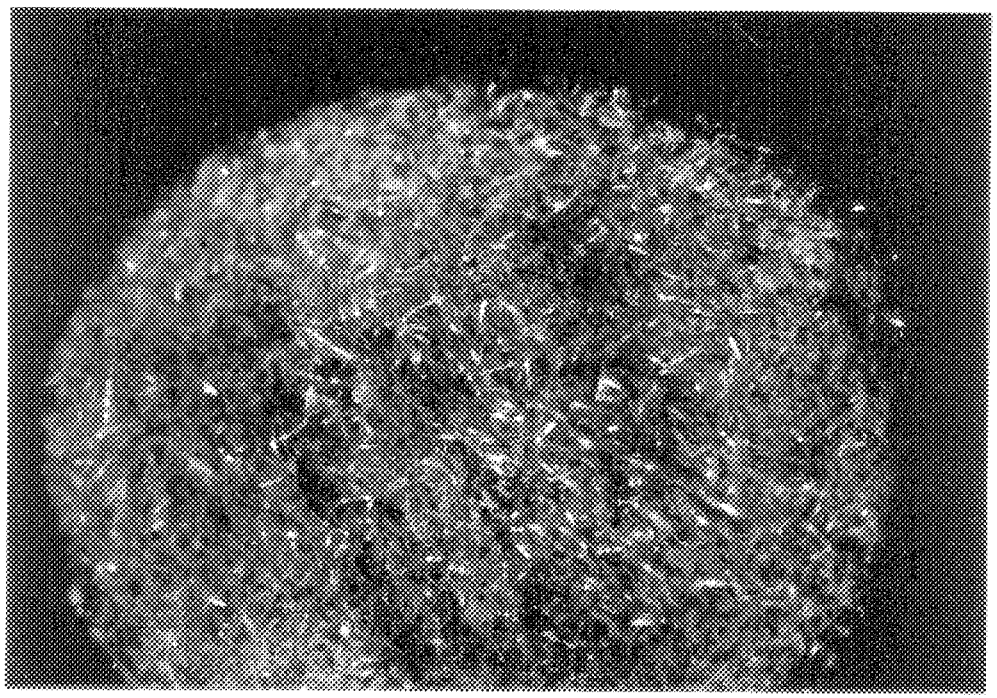
FIG. 1A is a photograph of a cross-section of a used cigarette filter illustrating the reduced tar produced by propolis-treated tobacco.
Figure 1B:
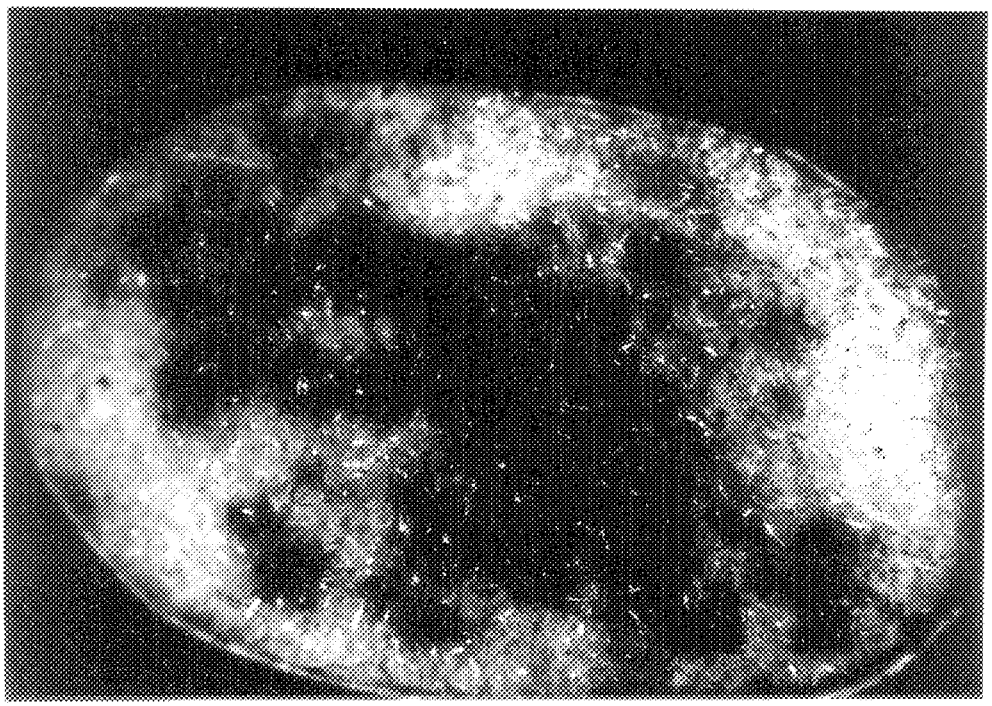
FIG. 1B is a photograph of a cross-section of a used cigarette filter illustrating the tar produced by untreated tobacco.

One preferred embodiment of the invention relates to tobacco chewing gum, which is formulated from a gum base. The traditional composition that makes up a standard gum base includes, as ingredients, sugar, gum substances, corn syrup, dextrose, softeners, sorbitol and other natural or artificial flavorings. In this invention, perhaps minus the sweeteners, a minority quantity of tobacco of a tobacco source is added in order to provide the tobacco flavoring and taste. A low nicotine tobacco additive chewing gum is the end product.

The tobacco chewing gum is manufactured by adding a precise amount of cured or uncured yellow tobacco leaf, preferably treated by microwave exposure, to the raw gum base described above. In the preferred embodiment, the dust-like powdery tobacco that results from tobacco chopping is used. This powder can be added directly to a batch of gum base. In a preferred embodiment, approximately 1% to approximately 5% by weight of the tobacco dust is incorporated into gum base. The resulting mixture can be further flavored if so desired. The gum base then can be divided and formed into individual sticks or pieces of gum.

By adjusting the amount of tobacco additive, the tobacco-chewing gum mixture can vary in strength from mild to full-flavor. Further, the gum can be used as an adjunct to smoking tobacco or chewing tobacco to assist in the cessation or reduction of smoking or chewing tobacco. Moreover, since the gum of the present invention is processed for chewing enjoyment and not for lingual or buccal lodging, it reduces the potential for localized carcinogenic effects on the oral mucous membranes.

In another embodiment of the invention, propolis is applied directly to a tobacco source, generally tobacco leaf or tobacco chop, to enhance its flavor. Propolis, also known as bee bread or hive dross, is a resinous substance found in bee hives. It is collected by bees from the outer surface of pollen granules. Its uses may be manifold in chemistry, pharmacy and food sciences. It has a greenish-brown sticky mass, with an aromatic odor. Its extraction with alcohol yields a propolis wax. The residue from the alcohol extraction is called propolis resin, yielding propolis balsam on extraction with hot petroleum ether. Propolis balsam has a hyacinth odor and is said to contain 10% cinnamyl alcohol. In this particular invention, the whole tobacco leaf is sprayed or dipped in a propolis solution. A tincture of propolis is used, preferably in an approximately 0.1 to 10% liquid. The liquid can be an aqueous solution, an oil-based mixture, such as canola oil or any other appropriate liquid. The amount of propolis is in the order of 1 to 10 ounces per one hundred pounds of tobacco treated. The propolis solution or tincture is applied to the tobacco for the purpose of reducing the bitterness of its taste and to prolong the favorable aftertaste of the tobacco. The tobacco source with the propolis has a number of applications, as will be explained below, with the treated tobacco source in the end tobacco product being on the order of 0.01% to 5% of the total weight of the finished product.

The propolis-treated tobacco leaf of this invention may be used as a smoking tobacco or chewing tobacco. We have determined that propolis reduces the tar and particulate content of smoke inhaled by the smoker. The range of reduction is 10 to 30%. FIG. 1A illustrates filters cut open sagitally to show the reduced tar in propolis-treated tobacco (A) as opposed to untreated tobacco (B). Despite the reduction in tar and particulate content, the flavor of the cigarette or cigar remains intact. Whereas, when a filter is used to reduce the tar and particulate content, there is a corresponding deterioration of the tobacco flavor.

Moreover, adding the propolis provides for enhanced flavor with reduced bitterness in other consumables. For example, the present invention contemplates that a propolis-tobacco source can be added to coffee or tea before brewing to create a tobacco-flavored beverage. Alternatively, the propolis-tobacco can be added to a cup of the brewed beverage so as to allow individual adjustment of the tobacco flavor to the consumer's preference. It will be appreciated also that another tobacco source such as tobacco extract or untreated tobacco chop or powder can be added to the beverages, as just described, to create a tobacco-flavored beverage. Further, propolis solution may be added to other food products such as in order to enhance the taste and prolong the flavor.

Figure 2:
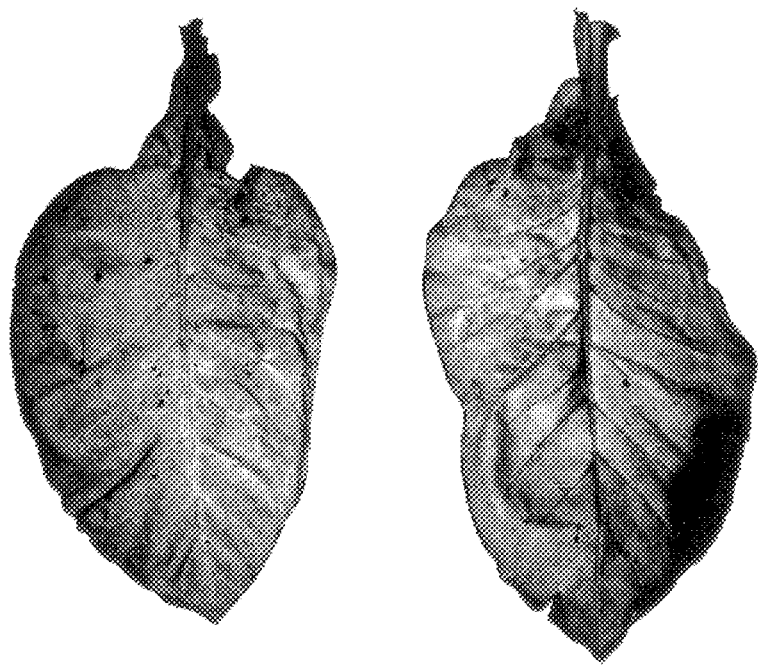
FIG. 2 is a photograph illustrating "yellow" fresh-cut, green tobacco aged 24 to 72 hours.

In another preferred embodiment, the tobacco source for various tobacco products is uncured or so-called "green" tobacco which is harvested and then undergoes its natural color transformation to a yellow appearance as the chlorophyll is converted to sugars. As illustrated in FIG. 2, low nitrosamine content, fresh-cut, green tobacco aged one to fifteen days becomes a "yellow" tobacco. The "yellow" tobacco has only slightly increased nitrosamines, significantly less than fully cured tobacco. Uncured "yellow" tobacco may have a relatively bitter, unpleasant flavor. This "yellow" tobacco then can be treated with propolis in order to make it usable for smoking tobacco or in gum or beverages. If it is desired to impart a richer tobacco flavor, a small quantity of tobacco extract can be sprayed on the "yellow" tobacco leaf with the propolis. This may result in some increase in the nitrosamine levels, but far less that in cured tobacco as conventionally used for smoking and chewing purposes.

Another preferred embodiment of the present invention includes a tobacco product comprising a tobacco-containing chewing gum wherein the tobacco source is treated with propolis. We have determined that propolis is a better gum softener than is sorbitol and that it extends the shelf life of the product at least two or three times longer that sorbitol which hardens over time. Thus, the propolis can be used in a chewing gum, sans tobacco, as a softener. Further, the propolis enhances flavor, as described above. In general, this embodiment comprises a tobacco-containing chewing gum wherein propolis-treated tobacco source, for example tobacco chop, of variable nicotine content is adds to a small quantity of chewing gum (1.2 to 3.5 g) so that the total nicotine content is less than 1 mg per piece of gum and wherein the natural tobacco source may contain a monoamine oxidase B inhibitor, such as that found in tobacco smoke. The preferred embodiment includes 1.4 g of chewing gum with 30 mg of propolis-treated tobacco chop containing 0.19 mg of nicotine with a gum base of 24% by weight. The propolis-treated tobacco chop consists of 1 to 10 ounces of propolis per 100 pounds of tobacco. The propolis can be added to the tobacco by spraying or by dipping.

The nicotine and monoamine oxidase B inhibitor content can be adjusted by adding more propolis-treated tobacco or chop or by using tobacco strains with higher nicotine content. For example, the addition of 150 mg of propolis-treated tobacco chop would result in just 10% by weight tobacco with approximately 1 mg of nicotine. Alternatively, some strains of tobacco leaf yield in excess of 0.14 mg of nicotine per 12 mg of tobacco and these can be used to modulate the chewing gum's nicotine content.

The afore-stated propolis-treated tobacco gum can be used to control smoking as well as suppressing the appetite to facilitate weight control in smokers who are trying to give up smoking and also in non-smokers. It is known that nicotine is an effective appetite suppressant. It will be appreciated by those skilled in the art that monoamine oxidase inhibitors also act as antidepressants. The present invention, therefore, provides an antidepressant effect. This effect also reduces the probability that a depressive state with excessive weight gain will be induced by cessation of smoking supplemented by the present invention.

Also, the various preferred embodiments of the present invention provide a healthier form of nicotine to suppress the progression of Alzheimer's disease. It is known that nicotine can suppress the progression of the disease. However, heretofore there has not been an safe and effective way of administering controlled levels of nicotine to the patient suffering from Alzheimer's disease. The amount of nicotine given to help control and suppress the disease can be titrated by the treating physician by providing one of the afore described novel products.

In another preferred embodiment of the present invention, the uncured "yellow" tobacco is treated in order to kill the microbes that would normally be active in the curing process. For example, flash convection heating for approximately one hour at temperatures of approximately 160° F. or more, freeze drying or microwaving for an adequate time, approximately 1 second to 5 minutes at powers from 50 watts to 100 kilowatts or more to dry the tobacco and kill the microbes is very effective to achieve this purpose.

Figure 3:
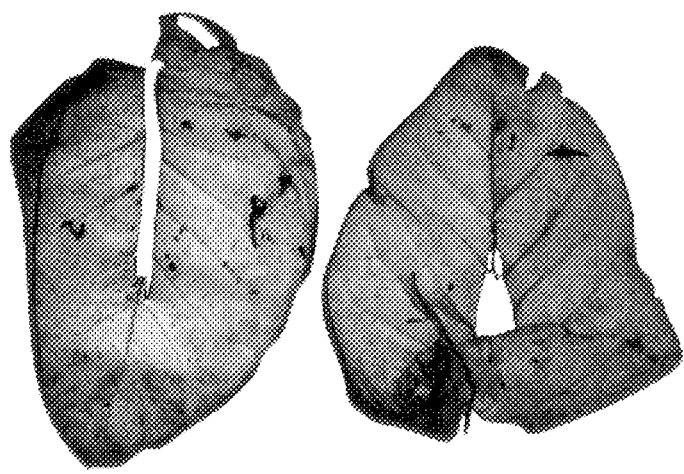
FIG. 3 is a photograph illustrating microwaved "yellow" tobacco.
Figure 4:
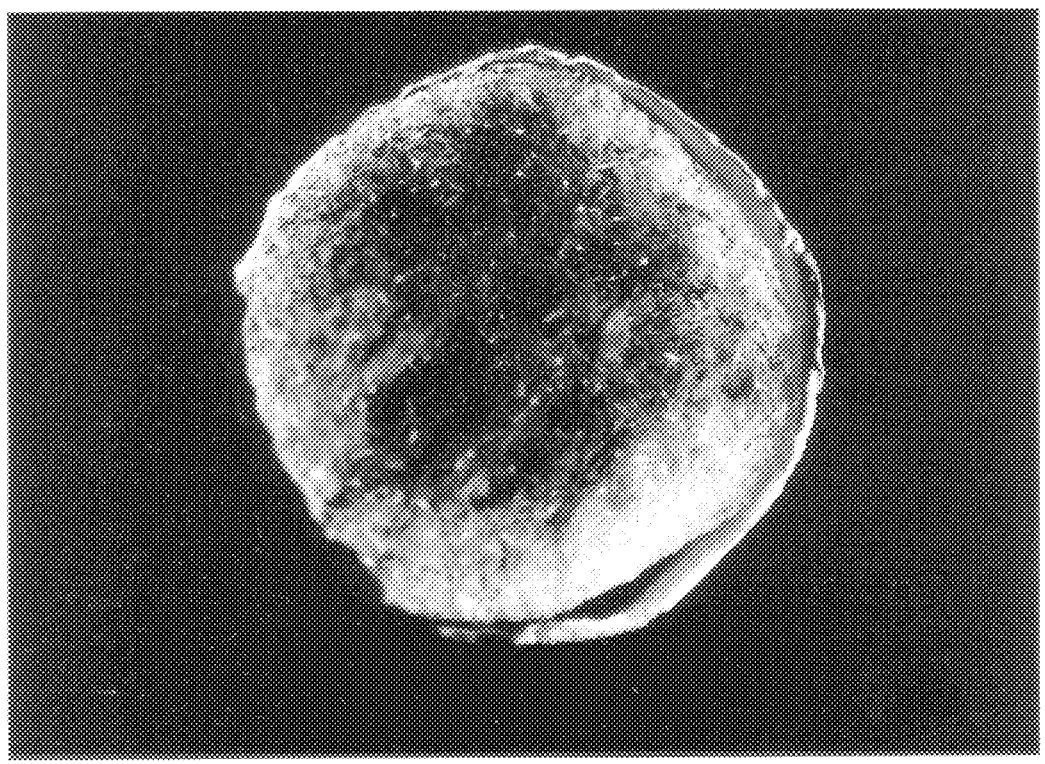
FIG. 4 is a photograph of a cross-section of a used cigarette filter illustrating the reduced tar produced by microwave treatment of "yellow" tobacco.

As disclosed in FIG. 3, the microwave treatment of aged, yellow tobacco results in a dried golden-colored tobacco product with dramatically reduced carcinogenic nitrosamines as opposed to cured tobacco untreated with microwave. You can note the partial stem removal of the leaf. In addition, FIG. 4 discloses the cross-section of a filter, for a cigarette, cut open to show the dramatic reduction in tar in a microwaved yellow tobacco cigarette.

In another preferred embodiment, exposure to the microwave energy decomposes the nitrosamines that are present in tobacco, whether cured or uncured, by a factor of 3 to 1000 times or more, as shown in Table 1. This is best accomplished by a single leaf thickness exposure to microwave energy as opposed to stacks of leafs exposed to microwave.

TABLE 1

Average Carcinogenic Nitrosamines In Tobacco

| Tobacco | NNN (ppm*) | NNK (ppm*) |
| --- | --- | --- |
| Uncured Tobacco (Microwaved) | 0.131 ± 0.114 | 0.0004 ± 0.0001 |
| Regular (Cured) Tobacco | 3.782 ± 0.475 | 1.168 ± 0.059 |

NNN = N-Nitrosonornicotine
NNK = 4-(methylnitrosamine)-1-(3-pyridyl)-1-butanone
*+As measured by gas chromatography with standard deviation.

When treating cured tobacco, we have determined that rehydration facilitates the action of the microwave energy in reducing nitrosamines.

In one preferred embodiment, the cured tobacco product is rehydrated so that it is 10% or more water. Exposure to pulsed microwave energy reduces the nitrosamine and tar content. In another preferred embodiment, the cured tobacco product is heated. The effluent is treated by exposure to microwave energy before being reconstituted with the tobacco pulp. In this way, the nitrosamine and tar content of the cured tobacco product is reduced.

In yet another preferred embodiment, reconstituted "sheet" tobacco is rehydrated (10–70% by weight water) and then microwaved.

TABLE 2

Microwaved Treatment of Rehydrated Cured Tobacco

| | NNN (ppm) | NNK (ppm) |
| --- | --- | --- |
| Control: Cured Tobacco | 4.417 | 0.960 |
| Microwaved Rehydrated Sheet Tobacco | 1.60 | 0.350 |

In addition, microwaving reduces the tar content of cured or uncured tobacco 10% to 60%. The microwaving is done at settings in the 50 watts to 100 kilowatt or more range, and the exposure of the tobacco to the microwave energy, for approximately 1 second to 5 minutes, give or take, but preferably at 1–60 seconds or so, is effective in terminating a substantial quantity of the microbes within the tobacco. Reducing the microbial count tends to further reduce the carcinogenic effect of such tobacco. This further can be accomplished by convection heating for the specified time at a temperature range of approximately 150° to 190° F. Moreover, freezing the tobacco for approximately one to two hours at approximately −10° to −50° F. is effective to kill off microbes.

Subjecting the uncured tobacco to microwave energy, for the purposes described, is effective to decompose the nitrosamines of the tobacco and furthermore has the benefit of reducing the tar content of the tobacco. The technique of microwaving is facilitated by peeling and disposing of the stemdown one-third to one-half length of the tobacco leaf. The resultant microwaved tobacco leaf does not require the use of a thrasher machine since the undesirable part of the stem is already removed. As a result, the typical loss of tobacco product associated with thrashing is eliminated, reducing tobacco waste by 10% to 30%. The improved tobacco products of the present invention can be substituted in whole or part for normally-cured tobacco in cigarettes, cigars, chewing tobacco, tobacco chewing gum, tobacco pouches, snuff, or tobacco flavoring and food additives. For the purposes of smoking, the present invention provides a less noxious odor while maintaining good smoking characteristics and providing full flavor with normal nicotine content. For the purposes of chewing, snuff, pouch and food additives, the present invention has a rich, pleasant flavor.

It will be apparent to those skilled in the art that various changes and modifications may be made in the preferred embodiments without departing from the scope of the appended claims. Therefore, the foregoing description is intended to be illustrative only and should not be viewed in a limiting sense.

We claim:

1. A method of reducing the nitrosamine levels or preventing formation of nitrosamines in a harvested tobacco plant, comprising
    exposing at least a portion of the plant to microwave energy, while said portion is uncured and in a state susceptible to having the amount of nitrosamines reduced or formation of nitrosamines arrested, for a sufficient time to reduce the amount of or substantially prevent formation of at least one nitrosamine.

2. The method of claim 1 wherein the microwave energy is delivered by waveguide to oven means.

3. The method of claim 1 wherein the portion of the tobacco plant comprises a yellow tobacco leaf having been aged one to fifteen days from harvest prior to microwave treatment.

4. The method of claim 1 further comprising a first step of preparing the tobacco for microwaving by stripping and removing the proximal one-third to one -half or the tobacco stem.

5. The method according to claim 1, wherein said exposing to microwave energy is carried out on a tobacco leaf or portion thereof after onset of yellowing in the leaf and prior to substantial accumulation of tobacco-specific nitrosamines in the leaf.

6. The method according to claim 1, wherein said microwave energy is delivered at a power level of about 50 watts to 100 kilowatts.

7. The method according to claim 1, wherein said microwave energy is applied to the plant for a period of at least about one second at a predetermined power level.

8. The method according to claim 7, wherein said microwave energy is applied to the leaf or portion thereof for a period of about one second to about 5 minutes at a predetermined power level.

9. The method according to claim 8, wherein said power level is from about 50 watts to 100 kilowatts.

10. The method according to claim 1, wherein said microwave energy is applied to the leaf or portion thereof for a time sufficient to effectively dry the leaf without adversely affecting suitability for human consumption.

11. The method according to claim 1, wherein said exposing to microwave energy prevents normal accumulation of at least one tobacco-specific nitrosamine in the leaf.

12. The method according to claim 11, wherein said at least one tobacco-specific nitrosamine is selected from the group consisting of N-nitrosonornicotine and 4-(methylnitrosoamino)-1-(3-pyridyl)-1-butanone.

13. The process according to claim 5, wherein said exposing to microwave energy is carried out on tobacco leaves arranged in single layer thickness, without stacking or piling of the leaves.

* * * * *

UNITED STATES PATENT AND TRADEMARK OFFICE
Certificate

Patent No. 5,803,081                                                               Patented: September 8, 1998

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Jonnie R. Williams, Goochland, Va.

Signed and Sealed this Third Day of November, 1998.

JOHN G. WEISS
                                                                                                                                    *SPE*
                                                                                                                               Art Unit 3735